Patented Feb. 19, 1935

1,992,122

UNITED STATES PATENT OFFICE 1,992,122

COATING MATERIAL AND PROCESS

Donald William Hansen, Decatur, Ill., assignor to A. E. Staley Manufacturing Company, Decatur, Ill., a corporation of Delaware No Drawing. Application August 22, 1931, Serial No. 558,840

4 Claims. (Cl. 91—68)

This invention relates to sizing and has more particular reference to the provision of a size adapted to be employed to cause various glues, pastes and cements to adhere to surfaces to which they are normally indifferent. An example of such material or surface is pyroxylin coated cloth or artificial leather.

The invention has for its principal object the provision of a sizing of the character just described, which may be easily and economically produced, stored for long periods without deterioration, easily prepared for application to the material to be coated, and easily applied thereto. Another important object of the invention is the provision of a size of the character described which will be substantially transparent, particularly in film coating layers, which will be flexible, and which will cause firm and permanent adherence between the glue or cement and the surface upon which the size has been placed.

My invention contemplates the production of a size of this sort, the base of which is a suitable prolamin, preferably zein, and contemplates the economical extraction of the zein from the nitrogenous or protein content of the corn kernels and its conversion into size and application to the artificial leather or other material indifferent or non-adhesive to the usual cements and glues, such as fish, hide, dextrins, etc. While the invention will hereinafter be described as embodied in a process relating to the production of a zein size, i. e. the size made from a prolamin of corn, it will be readily apparent that various other prolamins, such, for example, as gliadin from wheat, hordein from barley, kafirin from kafir corn, etc., may also be employed.

The prolamin zein is preferably obtained as a by-product in the manufacture or extraction of starch from Indian corn. The gluten, i. e. the nitrogenous or protein materials, is separated from water in settling tanks and, after the solid matter has settled, the water is drawn off and the gluten filtered in a plate and frame press, air being blown through the cake for a period to dewater it, preferably to a content of 50% solid matter and 50% water.

The extraction of the zein is accomplished by a mixture of alcohol and water to provide a solvent capable of dissolving the zein, this mixture being in the ratios by volume of preferably in the general neighborhood of 70% or 80% alcohol and 30% or 20% water. This alcohol conveniently may be either ethyl, methyl or propyl alcohol, or a mixture of these alcohols, and it is not intended to confine the invention to a particular solvent, it only being necessary that a suitable solvent be employed in the manner generally herein described.

A bulking material, such as the fibre of the corn hulls, rice hulls, etc., is preferably employed to facilitate the extraction of the zein. A quantity of this is mixed with the alcohol and the mixture placed in a suitable extractor and heated to in the neighborhood of 140° F. The gluten press cake, containing about 50% water, is slowly added while the mass is constantly stirred. When sufficient gluten has been added to bring the zein concentration up to approximately 6%, the stirring is stopped and after a short period of rest the solvent is drained through the screen bottom. The first solution is somewhat turbid but the remainder is sufficiently clear to permit the subsequent evaporation if desired without intermediate filtration. In the practice of this process, the water of the cake produces a mixture of solvent of about 80% of alcohol by volume, where commercial alcohol is used having a purity of approximately 95%. Care should be taken not to increase the water content to above 45%, otherwise there is danger of denaturing.

It is preferred, however, to filter the first solution and to this end it is heated to 140° F. for one-half hour and filtered through duck. The clear filtrate is then evaporated to a thin syrupy consistency and allowed to cool. A 70% alcohol solvent is used and the remaining solvent will contain about 50% water and on cooling the zein precipitates as a viscous liquid containing about 50% solids, 25% alcohol and 25% water. The supernatant liquid is removed and an equal weight of substantially 95% alcohol is added and thoroughly mixed with the zein. This mixture provides a paste of approximately 25% solids in an 83% alcohol solvent.

The zein is or may be precipitated from the first alcohol solution into a relatively large body of water and passing the residual gummy mass through rollers and drying at a low temperature, preferably under a vacuum. The powdered zein is or may be prepared for application to artificial leather, pyroxylin, or other material, by redissolving it in a mixture of solvents, preferably composed of approximately 45% by volume denatured ethyl alcohol (for example Formula 30), 35% acetone and 10% water. Preferably also a quantity of 10% of a high boiling solvent as butyl acetate, is added to this mixture.

If desired, a small amount of a plasticiser, such as dibutyl phthalate may be added to render the applied film of zein more flexible. This may be particularly desirable where the zein is brought to a dry powdered state prior to its application to the artificial leather or other material. Where it is provided in paste form, as earlier described, it is believed that a small amount of oil is contained, which acts as a natural plasticiser.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

Certain novel features of the present invention are claimed in applicant's co-pending applications Serial Nos. 595,960, filed February 29, 1932; 634,618, filed Sept. 23, 1932; 701,863, filed Dec. 11, 1933; 746,413, filed October 1, 1934; and 752,537, filed Nov. 10, 1934.

I claim:

1. An article of the type described, comprising a base member having a normally glue-repellant surface of pyroxylin, a coating of zein on the surface of said pyroxylin, and a coating of glue adhesively secured to said transparent coating.

2. An article of the type described, comprising a flexible base member having a normally glue-repellant surface composed of pyroxylin, a flexible glue-receiving coating on said pyroxylin, said coating containing a prolamin and a plasticizer, and a coating of glue adhesively secured to said glue-receiving coating.

3. An article of the type described, comprising a base member having a normally glue-repellant surface composed of pyroxylin, a thin film of zein on said glue-repellant surface, and a film of glue adhesively secured to said film of zein.

4. The process for applying glue to a glue-repellant material soluble in prolamin solvents, which comprises treating the surface of said material with a solution of a prolamin in a solvent which will dissolve said material, drying the solvent to form a prolamin coating on said material, and applying glue to said prolamin coating.

DONALD WILLIAM HANSEN.